United States Patent [19]

Eldred et al.

[11] 4,066,590
[45] Jan. 3, 1978

[54] ETHYLENE-PROPYLENE ELASTOMERS AND ETHYLENE-PROPYLENE-DIENE ELASTOMERS WITH IMPROVED HEAT AND OIL RESISTANCE

[75] Inventors: Roger J. Eldred, Detroit; Stanley A. Iobst, Sterling Heights; Ismat A. Abu-Isa, Birmingham, all of Mich.

[73] Assignee: General Motors Corporation, Detroit, Mich.

[21] Appl. No.: 714,027

[22] Filed: Aug. 13, 1976

[51] Int. Cl.$^2$ .............................................. C08L 91/00
[52] U.S. Cl. ......................... 260/28.5 A; 260/28.5 B; 260/42.43; 260/42.44; 260/42.45; 260/45.75 W; 260/45.75 R; 260/45.85 B; 260/45.95 H
[58] Field of Search ..................... 260/28.5 A, 28.5 B, 260/45.75 W, 45.85 B, 45.75 R, 45.95 H, 42.43, 42.44, 42.45

[56] References Cited

U.S. PATENT DOCUMENTS

| 3,882,065 | 5/1975 | Snow, Jr. et al. .............. 260/28.5 B |
| 3,988,227 | 10/1976 | Eldred ............................ 204/159.17 |

OTHER PUBLICATIONS

Nordel Formulated for Maximum Heat Resistance, Elastomer Supplier Formulation, one page.
Hercules Peroxide Cured EPDM Formulations, one page.

*Primary Examiner*—Melvyn I. Marquis
*Attorney, Agent, or Firm*—George A. Grove

[57] ABSTRACT

In an exemplary embodiment a high temperature and oil resistant elastomer composition includes the peroxide-induced reaction product of, by weight, 100 parts ethylene-propylene-diene rubber, about 20 parts of a suitable crosslinking monomer, about 8 parts of a chlorinated organic material such as Chlorowax LV, about 10 parts of a suitable hindered phenolic antioxidant 10 to 15 parts zinc oxide and 5 to 8 parts magnesium oxide. The elastomer formulation may optionally contain suitable reinforcing and/or semireinforcing fillers and processing oils. A similar ethylene-propylene rubber formulation may be prepared. The resulting elastomer formulations have remarkable oil resistance and retain a significant elongation even after aging at 177° C. (350° F.) for 168 hours.

5 Claims, No Drawings

ETHYLENE-PROPYLENE ELASTOMERS AND ETHYLENE-PROPYLENE-DIENE ELASTOMERS WITH IMPROVED HEAT AND OIL RESISTANCE

This invention pertains to specific ethylene-propylene (EPM) and ethylene-propylene-diene (EPDM) elastomers that have been specifically formulated to have excellent oil resistance and high temperature resistance. More specifically, this invention pertains to peroxide-cured EPM and EPDM formulations that contain suitable specific ingredients including a crosslinking monomer, a halogenated organic material, a hindered phenolic antioxidant and zinc oxide or zinc oxide and magnesium oxide with the result that the cured elastomer formulation has improved resistance to oil and a heat resistance greater than any other general purpose rubber.

EPM and EPDM are now recognized as excellent, inexpensive, general purpose elastomers that have good heat resistance but are not particularly resistant to oil. The oil resistance of EPDM elastomers has been increased significantly by curing the elastomer, preferably by radiation curing, in the presence of a suitable crosslinking monomer such as trimethylolpropane trimethacrylate. However, heretofore the art has not been able to produce in a single EPM or EPDM rubber both exceptional high temperature resistance and good oil resistance. By exceptional temperature resistance we mean an elastomer having a residual ultimate elongation of at least 90% after aging 168 hours at 177° C. (ASTM D-576-67). By good oil resistance we mean an elastomer having a volume swell no greater than 130% after immersion is ASTM #3 oil at 150° C. for 70 hours (ASTM D-471-68).

It is an object of the present invention to provide a basic general peroxide-cured EPM or EPDM (or mixtures) elastomer formulation initially containing a crosslinking monomer, a chlorinated or brominated organic additive, a suitable hindered phenolic antioxidant and zinc oxide together with any desired suitable fillers and processing oils. The resultant peroxide-cured formulation combines both resistance to hydrocarbon oil while retaining its flexibility and elongation although subjected to high temperatures of the order of 177° C. for extended periods of time.

BRIEF SUMMARY OF THE INVENTION

In accordance with an exemplary preferred embodiment of our invention, the above and other objects and advantages are accomplished by mixing and milling together in accordance with conventional rubber processing practice a resin mixture comprising, by weight, 100 parts ethylene-propylene rubber or ethylene-propylene-diene rubber (or mixtures), about 18 to 22 parts of a crosslinking monomer such as triallylisocyanurate or trimethylolpropane trimethacrylate, about 7 to 9 parts of a chlorinated or brominated organic material such as Chlorowax LV that contains at least 30% of said halogen and is nonfugitive from the subject elastomer formulation at 350° F., about 9 to 11 parts of a hindered phenolic antioxidant such as tetrakis [methylene 3-(3',5'-di-t-butyl-4'-hydroxyphenyl)propionate]methane (available commercially from Ciba-Geigy as Irganox 1010), and 10 to 15 parts of zinc oxide and 5 to 8 parts of magnesium oxide.

Other conventional EPM and EPDM additives, processing aids, pigments, fillers and the like may be added where desired without departing from our invention.

For example, in a preferred embodiment the elastomer composition may also contain 40 to 80 phr of a reinforcing filler, 0 to 60 phr of a semireinforcing filler, and 0 to 40 phr of a suitable processing oil. The formulation is cured with dicumyl peroxide or other peroxide suitable for curing EPM and EPDM resins.

The elastomers, constituted as described, typically exhibit a volume swell of about 110% when exposed to ASTM 3 oil for 70 hours at 150° C. as measured in accordance with ASTM D-471-68. Moreover, the elastomers retain their flexibility and elongation even though heated in air for extended periods at 177° C. A typical elastomer will display over 200% elongation after being heated 70 hours at 177° C., 100 to 150% elongation or more after being heated 168 hours and often over 90% elongation after 240 hours. So far as we have been able to determine, the oil resistance is generally attributable to the presence of the relatively large amounts of coagent crosslinking monomer and the excellent heat resistance is due to the combination of the chlorinated or brominated organic material, the hindered phenolic antioxidant as well as the presence of the zinc oxide. It is to be noted that the amount of antioxidant employed in the subject formulations is several times the amount of antioxidant typically employed in EPM or EPDM elastomers. Despite this large increase in antioxidant concentration, the peroxide-coagent cure is not adversely affected. Our invention involves the combination of these specified materials in peroxide-cured EPM and EPDM elastomer formulations. The benefits of the invention are realized across the broad range of variations in fillers (reinforcing and nonreinforcing), processing oils, pigments and other additives and aids employed in the many different EPM and EPDM elastomer compositions.

There are obviously many uses for oil and temperature resistant elastomers. We feel that they are particularly useful in under-hood applications in motor vehicles, such as ignition cable coatings, radiator hose and radiator cap gaskets.

DETAILED DESCRIPTION OF THE INVENTION

Specific examples will further demonstrate the benefits and advantages of our invention.

EXAMPLE 1

The following materials and quantities were used: 100 parts by weight Vistalon (Exxon Corporation) 5600 EPDM elastomer (containing about 2 parts by weight of ethylene per part of propylene and employing 5-ethylidene-2-norbornene as the diene component); 40 phr HiSil 215 silica filler, 15 parts trimethylolpropane trimethacrylate (crosslinking monomer); 5 parts magnesium oxide (Maglite); 8 parts zinc oxide; 11.4 parts Chlorowax LV 70 (a chlorinated paraffin containing 40% by weight chlorine employed as a mixture of 70% of the chlorinated paraffin on clay); 10 parts Irganox 1010 antioxidant and 8 parts Dicup 40 KE dicumyl peroxide (40% on clay). The formulation was prepared by first adding about half of the powdery solids such as the silica, zinc oxide, magnesium oxide, and Irganox 1010 (all) to the bowl of a Banbury mixer. The Vistalon 5600 and the Chlorowax were then added to the mixer. The mixer was operated for about two minutes. The temperature reached 290° F. The mixture was cooled to about 150° F. The balance of the powdery solids, to which the crosslinking monomer had been added, were mixed in.

The temperature was not allowed to exceed 190° F. The mixture was then sheeted out on a two-roll rubber mill. Finally, the dicumyl peroxide was dispersed into the rubbery mixture. The compound was then compression molded into ASTM tensile slabs under a pressure of 40,000 psi at 350° F. for seven minutes.

A number of the tensile specimens were subjected to aging in air at a temperature of 177° C. After aging for 70 hours, three specimens were removed. They were still flexible, and they displayed a median elongation (ASTM D-412-66) at break of 280% The balance of the specimens were further heated. After 168 hours at 177° C., three more samples were removed. They were still flexible and found to have a median elongation at break of 200%. Finally, after 336 hours at the elevated temperature the remaining samples were found to have an elongation at break of 120%.

We have found that Irganox 1010 alone will protect the subject elastomers for up to 70 hours exposure at 176° C. However, to obtain the high level of durability at elevated temperatures provided by the subject invention, all of the elements of our antioxidant system, including also the chlorinated organic material and the zinc oxide, must be employed. Where the metal oxides were eliminated from the above formulation the elongation after aging 168 hours was only 5%.

A number of additional formulations were prepared as described above differing in composition only in the halogenated compound. Otherwise they were prepared and tested as described in this Example 1.

The following Table I lists the several halogen-containing materials that were employed in the respective formulations. It reports the percent elongation of the elastomeric samples remaining after aging in air for specified times at 177° C.

nonfugitive from the mix at temperatures of 350° F. However, not all such halogenated materials work and others should be evaluated for effectiveness. As seen in Table I, for some reason, now not presently understood, tetrabromophthalic anhydride and tetrachlorophthalic anhydride are not suitable.

EXAMPLE 2

A series of EPDM elastomer formulations were prepared which varied only in the antioxidant that was employed. Basically, the formulations each contained the following ingredients in the quantities indicated: Vistalon 5600 EPDM elastomer, 100 parts; polychloroprene rubber (neoprene W), 8 parts; magnesium oxide (Maglite D), 5 parts; zinc oxide, 15 parts; Silene D silica filler, 60 parts; Mistron Vapor (talc), 40 parts; Sunpar 2280 (paraffinic processing oil), 20 parts; trimethylolpropane trimethacrylate, 20 parts; dicumyl peroxide (DiCup D 40 KE), 8 parts; and a commercially available hindered phenolic antioxidant as will be indicated below. The several different formulations, including the respective antioxidants, were mixed and milled as described in Example 1. ASTM tensile slabs were compression molded as described and heat aging tests were performed. In addition, coupons were cut from tensile slabs and immersed in ASTM 3 oil for 70 hours at 150° C. The percentage increase in volume due to oil absorption was determined in accordance with ASTM 471-68.

In Table II below is summarized the identity of the several hindered phenolic antioxidants employed in the formulations. Also tabulated is the percent elongation of the samples after aging in air at 177° C. for various periods of time. The table also summarizes the volume percent oil swell of the specimen in ASTM 3 oil. Also tabulated in the Table II is the volume swell fraction, $v_2$, Table I

| Halogen Containing Compound | Percent Elongation Remaining After Aging (ASTM D-576) at 177° C. | | |
|---|---|---|---|
| | 70 Hours | 168 Hours | 336 Hours |
| None | 240 | 10 | — |
| 1,4,5,6,7,7-Hexachloro-5-norbornene-2,3-dicarboxylic anhydride (8 phr) | 285 | 240 | 75 |
| 2-Bromonaphthalene-bis(hexachloro cyclopentadiene) adduct (8 phr) | 280 | 160 | — |
| Hexabromobenzene (8.3 phr) | 260 | 120 | — |
| 1,2,5,6,9,10-Hexabromo cyclododecane (9.7 phr) | 220 | 110 | — |
| Tetrabromophthalic anhydride (10.5 phr) | Unsatisfactory | | |
| Tetrachlorophthalic anhydride (6.5 phr) | Unsatisfactory | | |
| 2,4,5,6-Tetrachloro-m-xylene (5.5 phr) | 275 | 100 | — |
| Chlorowax LV 70 (11.4 phr) | 280 | 200 | 120 |
| Chlorowax LV (8 phr) | 280 | 205 | — |
| Chlorowax 70 (4.6 phr) | 160 | 100 | — |
| Polychloroprene (8 phr) | — | 115 | — |
| Chlorinated polyethylene (8 phr) | — | 115 | — |

It is seen that many different halogenated organic materials including chlorinated polyethylene and polychloroprene are useful in our EPDM (and likewise EPM) elastomer-based formulations to provide heat resistance. Of the many halogenated organic compounds that have been employed in our formulation successfully, it has been observed that they uniformly contain about 30% by weight of halogen and they are of the respective elastomers. This value is determined by immersing the samples in toluene at room temperature until equilibrium swelling has been obtained. This usually requires about seven days. The value of $v_2$ is determined gravimetrically. This value is an indication of the cure state or crosslinking density of the polymer.

Table II

| Antioxidant | Volume Swell Fraction, $v_2$ | Percent Elongation Remaining After Aging at 177° C. (ASTM D-576) | | | Volume Percent Oil Swell (ASTM D-471) |
|---|---|---|---|---|---|
| | | 70 Hours | 168 Hours | 336 Hours | |
| Irganox[1] 1010 tetrakis[methylene-3-(3',5'-di-t-butyl-4'-hydroxyphenyl) propionate] methane | 0.310 | 175 | 130 | 90 | 120 |
| Irganox 259 1,6-hexamethylene-bis-(3,5-di- | 0.310 | 185 | 135 | 90 | 114 |

Table II-continued

| Antioxidant | Volume Swell Fraction, $v_2$ | Percent Elongation Remaining After Aging at 177° C. (ASTM D-576) | | | Volume Percent Oil Swell (ASTM D-471) |
| --- | --- | --- | --- | --- | --- |
| | | 70 Hours | 168 Hours | 336 Hours | |
| t-butyl-4-hydroxy hydrocinnamate) | | | | | |
| Irganox 1076 octodecyl 3,5-di-t-butyl-4-hydroxy hydrocinnamate | 0.282 | 195 | 145 | 80 | 121 |
| Irganox 1035 thiodiethylene-bis-(3,5-di-t-butyl-4-hydroxy hydrocinnamate) | 0.318 | 205 | 150 | 75 | 110 |
| Antioxidant[2] 702 4,4'-methylene-bis-(2,6-di-t-butylphenol) | 0.278 | 180 | 120 | 65 | 147 |
| Antioxidant 330 1,3,5-trimethyl-2,4,6-tris[3,5-t-butyl-4-hydroxybenzyl] benzene | 0.314 | 150 | 85 | 50 | 116 |
| Antioxidant 736 4,4'-thiobis(6-t-butyl-o-cresol) | — | No Cure | | | |

[1]Trademark of Ciba-Geigy Company
[2]Trademark of Ethyl Corporation

It will be noted that all the antioxidants are of the hindered phenolic type. Each of the antioxidant molecules contained at least one phenolic group positioned between two tertiary butyl groups. Most of the formulations produced elastomers having both excellent resistance to oil and excellent resistance to heat aging. Only Antioxidant 736 prevented the cure of the elastomer in which it was employed, and Antioxidant 702 inhibited the cure so that the oil swell was unsatisfactorily high and the $v_2$ value was low. The other hindered phenolic antioxidants tested in this example were effective. In general, subject to a few exceptions as noted, hindered phenolic antioxidants are suitable for use in the practice of our invention. It has been our experience, however, that other types of antioxidants are unsuitable for use in our oil and high temperature resistant EPM and EPDM elastomers. They either inhibit the cure or show no antioxidant activity in the elastomer formulation.

EXAMPLE 3

An ethylene-propylene copolymer-based elastomer composition was prepared of the following formulation in parts by weight.

| Ingredient | Parts |
| --- | --- |
| Vistalon 707 (Exxon), EPM rubber | 100 |
| Carbon black, N-762 | 5 |
| Maglite D, MgO | 5 |
| ZnO | 10 |
| Irganox 1010 | 10 |
| HiSil 225, silica | 40 |
| Silene D, silica | 30 |
| Sunpar 2280, paraffinic oil | 10 |
| Mistron Vapor, talc | 30 |
| Chlorowax LV | 10 |
| Triallylisocyanurate | 14.8 |
| DiCup 40 KE, dicumyl peroxide | 9 |

These ingredients were formulated by the procedure set forth in Example 1. Test specimens were prepared as described above and the described heat resistance and oil resistance tests performed with the following results.

| | Aged at 177° C. (ASTM D-576) | | |
| --- | --- | --- | --- |
| | 70 Hours | 244 Hours | 336 Hours |
| Tensile Strength, psi | 1,700 | 1,680 | 1,720 |
| Remaining % Elongation | 125 | 100 | 90 |

Test specimens had an oil swell after 70 hours at 150° C. in ASTM #3 oil of 90% by volume.

EXAMPLE 4

An ethylene-propylene-diene terpolymer-based elastomer composition containing a reinforcing carbon black was prepared of the following formulation in parts by weight.

| Ingredient | Parts |
| --- | --- |
| Vistalon 5600 (Exxon), EPDM rubber | 100 |
| Carbon black, N-330 | 60 |
| Sunpar 2280, paraffinic oil | 20 |
| Irganox 1010 | 10 |
| Neoprene W | 8 |
| Trimethylolpropane trimethacrylate | 18 |
| Magliet D, MgO | 5 |
| Zinc oxide | 15 |
| DiCup 40 KE, dicumyl peroxide | 8 |

These ingredients were formulated by the procedure set forth in Example 1. Test specimens were made and subjected to heat and oil resistance tests. The remaining elongation after aging 168 hours at 177° C. was 125%. The volume swell in ASTM #3 oil after 70 hours at 150° C. was 116%.

As is known, EPDM resins are terpolymers of ethylenepropylene and a diene monomer. The resulting copolymer is unsaturated due to the presence of the small amount of the diene material. Commercial EPDM materials typically employ either 5-ethylidene-2-norbornene or linear 1,4-hexadiene as the diene material. Suitable EPDM resins for use in the subject formulations are marketed under the trade names "Epcar" by the B. F. Goodrich Corporation, "Vistalon" marketed by Exxon, and "Nordel" marketed by Du Pont. These materials typically vary in ethylene content from about 45% to 70% by weight, in propylene content from about 25% to 50% by weight, and in diene content from about 3% to 8% by weight.

EPM resins are elastomeric copolymers of ethylene and propylene and usually contain 50% by weight or more ethylene. EPDM and EPM resins, or mixtures thereof, are the basic elastomeric constituents of our formulations.

It is believed the oil resistance of our EPM and EPDM based formulations are largely attributable to the presence or use of the crosslinking monomer in the formulation. Suitable crosslinking monomers that have been employed in our formulations include trimethylolpropane trimethacrylate, triallyl isocyanurate, polyethylene glycol dimethacrylate and ethylene glycol dimethacrylate. The crosslinking monomer is suitably present in an amount in the range of 10 to 35 parts by weight per 100 parts of EPM or EPDM rubber.

The molecular weights of suitable hindered phenolic antioxidants may vary considerably. We employ a very large amount of such antioxidant as compared to conventional practice. Suitably, 0.025 to 0.055 equivalents of a di-tertiary-butyl group hindered phenol antioxidant are employed per 100 parts of EPM or EPDM resin. The equivalent weight of such an antioxidant is determined by dividing its molecular weight by the number of hindered phenolic groups in its molecule.

At least six parts of a suitable chlorinated or brominated organic material per 100 parts of EPM or EPDM resin are employed. While 6 to 10 phr are usually sufficient, larger amounts may be employed if necessary or desirable. The organic material should contain at least 30% by weight halogen and should not vaporize from the finished elastomer composition at temperatures under 350° F.

It has been our experience that our formulations necessarily include zinc oxide, and magnesium oxide may be employed in addition to the zinc oxide. Ten to 25 parts of zinc oxide per 100 parts of resin are suitably employed. Mixtures of 10 to 15 parts ZnO and 5 to 8 parts MgO are also useful.

Our EPDM based formulations are peroxide-cured. As has been demonstrated, dicumyl peroxide is suitable and preferred. Other well known peroxide curing materials for EPDM elastomers may suitably be employed. Examples include $\alpha, \alpha'$-bis(t-butyl peroxy) diisopropylbenzene and 2,5-dimethyl-2,5-bis(t-butyl peroxy) hexane.

It has been our experience that conventional fillers, extender oils, processing aids, pigments and the like normally used in EPM and EPDM rubber may be employed in our formulations. Extender oils are suitably employed in amounts up to 60 phr. Reinforcing fillers are suitably employed in amounts of 40 to 120 phr and nonreinforcing fillers in the range of 0 to 100 phr.

While Applicants' invention has been described in terms of certain specific embodiments thereof, it will be appreciated that other forms could readily be adopted by one skilled in the art. Accordingly, Applicants' invention is to be considered limited only by the scope of the following claims.

It is also to be understood that each specific embodiment of our invention involves selecting specific ingredients from several classes of materials to form our elastomer compositions. It may be possible that some combinations of materials will not provide the unique elastomers and properties that we view as our invention. Therefore, we disclaim EPM and EPDM elastomers that might otherwise come within the compositional limitations of our claims but not the physical property limitations.

What is claimed is:

1. A high temperature and oil resistant elastomer composition comprising the peroxide-induced reaction product of, by weight,
   100 parts of an elastomeric polymer selected from the group consisting of ethylene-propylene rubber and ethylenepropylene-diene rubber,
   about 10 to 35 parts of a crosslinking monomer selected from the group consisting of trimethylolpropane trimethacrylate, triallyl isocyanurate, polyethylene glycol dimethacrylate and ethylene glycol dimethacrylate,
   at least 6 parts of a chlorinated or brominated organic material that contains at least 30% of said halogen and is nonfugitive from said product at 350° F.,
   about 0.025 to 0.055 equivalent per 100 parts of said polymer of a ditertiary butyl group hindered phenolic antioxidant that does not prevent said peroxide-induced reaction and
   10 to 25 parts of zinc oxide,
   said composition having a volume swell no greater than 130% when immersed in ASTM #3 oil at 150° C. for 70 hours (ASTM D-471-68) and having an ultimate elongation of about 90% or more after aging 168 hours at 177° V. (ASTM D-573-67).

2. A high temperature and oil resistant elastomer composition comprising the peroxide-induced reaction product of, by weight,
   100 parts of an elastomeric polymer selected from the group consisting of ethylene-propylene rubber and ethylene-propylene-diene rubber,
   about 10 to 35 parts of a crosslinking monomer selected from the group consisting of trimethylolpropane trimethacrylate, triallyl isocyanurate, polyethylene glycol dimethacrylate and ethylene glycol dimethacrylate,
   at least 6 parts of a chlorinated or brominated organic material that contains at least 30% of said halogen and is nonfugitive from said product at 350° F.,
   about 0.025 to 0.055 equivalent per 100 parts of said polymer of a hindered phenolic antioxidant selected from the group consisting of tetrakis[methylene-3-(3',5'-di-t-butyl-4'-hydroxyphenyl)propionate] methane; 1,6-hexamethylene-bis-(3,5-di-t-butyl-4-hydroxy hydrocinnamate); octodecyl 3,5-di-t-butyl-4-hydroxy hydrocinnamate; thiodiethylene-bis-(3,5-di-t-butyl-4-hydroxy hydrocinnamate); and 1,3,5-trimethyl-2,4,6-tris[3,5-t-butyl-4-hydroxybenzyl] benzene, and
   10 to 25 parts of zinc oxide,
   said composition having a volume swell no greater than 130% when immersed in ASTM #3 oil at 150° C. for 70 hours (ASTM D-471-68) and having an ultimate elongation of about 90% or more after aging 168 hours at 177° C. (ASTM D-573-67).

3. A high temperature and oil resistant elastomer composition comprising the peroxide-induced reaction product of, by weight,
   100 parts of an elastomeric polymer selected from the group consisting of ethylene-propylene rubber and ethylene-propylene-diene rubber,
   about 10 to 35 parts of a crosslinking monomer selected from the group consisting of trimethylolpropane trimethacrylate, triallyl isocyanurate, polyethylene glycol dimethacrylate and ethylene glycol dimethacrylate,
   at least 6 parts of a chlorinated or brominated organic material that contains at least 30% of said halogen and is nonfugitive from said product at 350° F.,
   about 0.025 to 0.055 equivalent per 100 parts of said polymer of a ditertiary butyl group hindered phenolic antioxidant that does not prevent said peroxide-induced reaction,
   10 to 25 parts of zinc oxide,
   40 to 120 parts of a reinforcing filler and
   0 to 100 parts of a nonreinforcing filler,
   said composition having a volume swell no greater than 130% when immersed in ASTM #3 oil at 150° C. for 70 hours (ASTM D-471-68) and having an ultimate elongation of about 90% or more after aging 168 hours at 177° C. (ASTM D-573-67).

4. A high temperature and oil resistant elastomer composition comprising the peroxide-induced reaction product of, by weight,
- 100 parts of an elastomeric polymer selected from the group consisting of ethylene-propylene rubber and ethylene-propylene-diene rubber,
- about 10 to 35 parts of a crosslinking monomer selected from the group consisting of trimethylolpropane trimethacrylate, triallyl isocyanurate, polyethylene glycol dimethacrylate and ethylene glycol dimethacrylate,
- at least 6 parts of a chlorinated or brominated organic material that contains at least 30% of said halogen and is nonfugitive from said product at 350° F.,
- about 0.025 to 0.055 equivalent per 100 parts of said polymer of a hindered phenolic antioxidant selected from the group consisting of tetrakis[methylene-3-(3',5'-di-t-butyl-4'-hydroxyphenyl)propionate] methane; 1,6-hexamethylene-bis-(3,5-di-t-butyl-4-hydroxy hydrocinnamate); octodecyl 3,5-di-t-butyl-4-hydroxy hydrocinnamate; thiodiethylene-bis-(3,5-di-t-butyl-4-hydroxy hydrocinnamate); and 1,3,5-trimethyl-2,4,6-tris [3,5-t-butyl-4-hydroxybenzyl] benzene,
- 10 to 25 parts of zinc oxide,
- 40 to 120 parts of a reinforcing filler and
- 0 to 100 parts of a nonreinforcing filler,
- said composition having a volume swell no greater than 130% when immersed in ASTM #3 oil at 150° C. for 70 hours (ASTM D-471-68) and having an ultimate elongation of about 90% or more after aging 168 hours at 177° C. (ASTM D-573-67).

5. A high temperature and oil resistant elastomer composition comprising the peroxide-induced reaction product of, by weight,
- 100 parts of an elastomeric polymer selected from the group consisting of ethylene-propylene rubber and ethylene-propylene-diene rubber,
- about 10 to 35 parts of a crosslinking monomer selected from the group consisting of trimethylolpropane trimethacrylate, triallyl isocyanurate, polyethylene glycol dimethacrylate and ethylene glycol dimethacrylate,
- at least 6 parts of a chlorinated or brominated organic material that contains at least 30% of said halogen and is nonfugitive from said product at 350° F.,
- about 0.025 to 0.055 equivalent per 100 parts of said polymer of a hindered phenolic antioxidant selected from the group consisting of tetrakis[methylene-3-(3',5'-di-t-butyl-4'-hydroxyphenyl)propionate] methane; 1,6-hexamethylene-bis-(3,5-di-t-butyl-4-hydroxy hydrocinnamate); octodecyl 3,5-di-t-butyl-4-hydroxy hydrocinnamate; thiodiethylene-bis-(3,5-di-t-butyl-4-hydroxy hydrocinnamate); and 1,3,5-trimethyl-2,4,6-tris[3,5-t-butyl-4-hydroxybenzyl] benzene,
- 10 to 15 parts of zinc oxide,
- 5 to 8 parts of magnesium oxide,
- 40 to 120 parts of a reinforcing filler and
- 0 to 100 parts of a nonreinforcing filler,
- said composition having a volume swell no greater than 130% when immersed in ASTM #3 oil at 150° C. for 70 hours (ASTM D-471-68) and having an ultimate elongation of about 90% or more after aging 168 hours at 177° C. (ASTM D-573-67).

* * * * *